US006801319B2

(12) United States Patent
Szafraniec et al.

(10) Patent No.: US 6,801,319 B2
(45) Date of Patent: Oct. 5, 2004

(54) SYMMETRICAL DEPOLARIZED FIBER OPTIC GYROSCOPE

(75) Inventors: Bogdan Szafraniec, Sunnyvale, CA (US); Charles Lange, Glendale, AZ (US); Andrew Kaliszek, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 130 days.

(21) Appl. No.: 10/038,131

(22) Filed: Jan. 3, 2002

(65) Prior Publication Data

US 2003/0123064 A1 Jul. 3, 2003

(51) Int. Cl.[7] .............................................. G01C 19/64
(52) U.S. Cl. ...................................................... 356/460
(58) Field of Search ................................ 356/460, 462, 356/464, 483; 250/227.19, 227.27; 385/12

(56) References Cited

U.S. PATENT DOCUMENTS

| | | | |
|---|---|---|---|
| 5,157,461 A | * 10/1992 | Page ........................... | 356/462 |
| 5,187,757 A | 2/1993 | Ohno et al. | |
| 5,347,354 A | * 9/1994 | Muller et al. ............... | 356/466 |
| 5,377,283 A | 12/1994 | Blake et al. | |
| 5,563,705 A | 10/1996 | Sanders | |
| 5,598,489 A | 1/1997 | Pavlath et al. | |
| 5,602,642 A | 2/1997 | Bergh et al. | |
| 5,854,678 A | * 12/1998 | Liu et al. .................... | 356/462 |
| 5,999,304 A | 12/1999 | Sanders et al. | |
| 6,175,410 B1 | * 1/2001 | Szafraniec et al. ......... | 356/459 |
| 6,211,963 B1 | * 4/2001 | Kaliszek et al. ............ | 356/465 |

FOREIGN PATENT DOCUMENTS

| | | |
|---|---|---|
| DE | 42 23 740 | 1/1994 |
| WO | WO 98/00682 | 1/1998 |
| WO | WO 00/39528 | 7/2000 |

OTHER PUBLICATIONS

Herdman, "Fiber–Optic Gyroscopes", *Scientific Honeyweller*, 1996, pp. 88–95.
Kajioka et al, Fiber Optic Gyros: 20th Anniversary Conference, Aug. 5–6 1996, Denver, Colorado, *SPIE*, vol. 2837, pp. 18–33.
Albert Tebo, "High–quality fiber–optic gyros no longer just a dream", *SPIE Web*, Feb. 1997.
Bogdan Szafraniec, Fiber Optic and Laser Sensors XIII, Jun. 20–21 1995, Munich, Germany, *SPIE*, vol. 2510, pp. 37–48.

* cited by examiner

*Primary Examiner*—Samuel A. Turner
(74) *Attorney, Agent, or Firm*—Schiff Hardin LLP

(57) ABSTRACT

A fiber optic gyroscope (FOG) including a depolarizer having substantially equal first and second fiber segments of polarization maintaining (PM) fiber coupled to a single mode (SM) fiber loop. The first PM fiber segment includes sections of fiber connected together via a splice having an angle from about 35° to 55° between major axes of polarization of the sections which it connects. Similarly, the second PM fiber segment includes sections of fiber connected together via a splice having an angle from about 35° to 55° between major axes of polarization of the sections which it connects. The length of each fiber section is chosen to maintain the thermal and mechanical symmetry of the SM fiber loop.

19 Claims, 5 Drawing Sheets

SYMMETRICAL DEPOLARIZED FIBER OPTIC GYROSCOPE

TECHNICAL FIELD OF THE INVENTION

The present invention generally relates to fiber optic gyroscopes. In particular, the present invention relates to a fiber optic gyroscope incorporating a pair of thermally and mechanically symmetrical polarization-maintaining (PM) fiber segments for reducing polarization errors.

BACKGROUND OF THE INVENTION

Fiber optic gyroscopes (FOG) are increasingly employed in inertial guidance systems due to their ruggedness, compactness, and ability to sense very small rotations in contexts where external navigational cues are unavailable or impracticable in its most basic form. A fiber optic gyroscope system comprises, a "minimum reciprocal configuration" as shown in FIG. 1.

Briefly, a light source 11 is used in conjunction with a fiber optic coupler 12, an integrated optic chip (IOC) 16, a loop 10, a photodetector 14, an amplifier 21, a phase sensitive detector (PSD) 23, a bias modulation system 20, and a rotation indicator 26. IOC 16 typically incorporates a polarizer 15, a splitter combiner 17, and a phase modulator 19. Alternatively, individual components, such as a polarizer, coupler and optical phase modulator may be used in the place of IOC 16.

The optical portion of the system contains several features within the optical path to assure that the system is reciprocal, i.e., that substantially identical optical paths are traversed by each of the opposite-traveling electromagnetic waves, except for the specific introductions of non-reciprocal phase difference shifts, as will be described below. Loop 10 comprises a long segment of optical fiber coiled about the rotational axis which is to be sensed. The optical fiber is typically 50 meters to 2,000 meters in length, and is part of a closed optical path in which an electromagnetic wave or light wave, is introduced and split into a pair of waves which propagate in clockwise (cw) and counterclockwise (ccw) directions through loop 10, such that portions of both waves are ultimately diverted by coupler 12 onto a photodetector 14.

The coiled optical fiber which forms loop 10 may be single mode (SM) fiber, a polarization-maintaining (PM) fiber, or a combination of SM and PM fiber. SM fiber allows the paths of the electromagnetic or light waves to be defined uniquely, and further allows the phase fronts of such a guided wave to also be defined uniquely. In contrast, PM fiber is constructed such that a very significant birefringence is produced in the fiber. As a result, polarization fluctuations introduced by unavoidable mechanical stresses, by the Faraday Effect in magnetic fields, or from other sources, which could lead to varying phase difference shifts between the counter-propagating waves, become relatively insignificant.

Thus, either the high refractive index axis, i.e., the slower propagation axis, or the low index axis, is chosen for propagating the electromagnetic waves depending on the other optical components in the system.

The electromagnetic waves which propagate in opposite directions through loop 10 are provided by light source 11. This source is typically a broadband light source, for example, a semiconductor super-luminescent diode or a rare-earth doped fiber light source providing electromagnetic waves, typically in the near-infrared part of the spectrum, over a range of wavelengths between about 830 nm to 1550 nm. Source 11 preferably exhibits a short coherence length for emitted light in order to reduce the phase shift difference errors between these waves due to Rayleigh and Fresnel scattering at scattering sites in loop 10. The broadband source also helps to reduce errors caused by the propagation of light in the wrong state of polarization.

Between light source 11 and fiber optic loop 10 there is shown an optical path arrangement formed by the extension of the ends of the optical fiber forming loop 10 to some optical coupling components which separate the overall optical path into several optical path portions. A portion of optical fiber extends from light source 11 to optical coupler 12 also known as a wave combiner/splitter.

Optical directional coupler 12 has light transmission media therein which extends between four ports, two on each end of the media, which are shown on each end of coupler 12. One of these ports receives the optical fiber extending from light source 11. Another port on the sense end of coupler 12 communicates with photodetector 14, which detects electromagnetic waves, or light waves, impinging thereon, such as through the use of a p-i-n diode. In the case of two nearly coherent light waves, this output generally depends on the cosine of the phase difference between such a pair of substantially coherent light waves.

Optical directional coupler 12 has another optical fiber coupled to a port at the other end thereof which extends to a polarizer 15 provided within IOC 16. The other port on the same side of coupler 12 typically comprises a non-reflective termination arrangement. Optical directional coupler 12, upon receiving a light beam at any of its ports, transmits approximately half of the incoming light to each port on the other end of coupler 12. Conversely, little or no light is transmitted to the port which is on the same end of coupler 12.

In an SM fiber, light can propagate in two polarization modes. Thus, polarizer 15 within IOC 16 is provided for the purpose of passing light propagating at one polarization state such that clockwise (cw) and counterclockwise (ccw) waves of the same polarization are introduced into loop 10, and only light of the same polarization for the cw and ccw waves interfere at detector 14.

Because polarizer 15 does not entirely block the light having an undesirable state of polarization, a small non-reciprocity between the counter-rotating light beams is introduced, causing a non-reciprocal phase shift difference which can vary according to, inter-alia, the environmental conditions. In this regard, the high birefringence in the optical fiber used or the broad bandwidth of the light source used again aids in reducing this resulting phase difference.

Light from polarizer 15 is split by a splitter/combiner 17 provided within IOC 16 such that half of the incoming signal is diverted to one end of loop 10, and half is diverted to the other end of loop 10. The counter-propagating beams returning to IOC 16 are then combined by splitter/combiner 17 and sent to photodetector 14 through polarizer 15 and coupler 12.

Optical modulator 19 provided within IOC 16 is capable of receiving electrical signals and thereby introducing a phase difference in electromagnetic waves transmitted therethrough by either changing the index of refraction or the physical length of the transmission medium, thereby changing the optical path length. Such electrical signals are typically supplied to modulator 19 by the bias modulation signal generator 20 providing either: (1) a sinusoidal voltage output signal at a modulation frequency $f_b$ that is intended to be equal to $C_1 \sin(\omega_b t)$, where $\omega_b$ is the radian frequency equivalent of the modulation frequency $f_b$, and $C_1$ is the amplitude of the modulation; or (2) a square wave modulation signal at $f_b$. Other suitable periodic waveforms may also be used.

In general, operation of a fiber optic gyroscope is based on the Sagnac Effect, which describes the behavior of two beams of light traveling in opposite directions around a path undergoing rotation. Of the two light beams, the beam moving in the same direction as the loop's rotation will necessarily travel a greater distance than the beam traveling the opposite direction. This difference in path length, while small, will necessarily induce a phase shift in the combined beam. The portion of the resultant beam diverted to photodetector 14 through coupler 12 may be analyzed to yield a precise rotation rate. More particularly, the phase shift induced by rotation of the fiber loop is given by:

$$\Delta\phi = \frac{2\pi LD}{\lambda c}\Omega$$

where $\Delta\phi$ is the relative phase shift, L is the fiber length, D is the loop diameter, $\lambda$ is the light source wavelength in a vacuum, $\Omega$ is the rotation rate, and c is the speed of light in a vacuum. In this way, the system may detect rotation rates to a high degree of accuracy.

The output light intensity impinging on photodetector 14 and hence, the current emanating from the photodetector system photodiode (not shown) in response to the counter-rotating beams, follows a raised cosine function. That is, the output current depends on the cosine of the phase difference between these two waves.

Since a cosine function is an even function, such an output function gives no indication as to the relative directions of the phase difference shift. Consequently, the output function itself provides no indication as to the direction of the rotation about the loop axis. In addition, the rate of change of a cosine function near zero phase is very small, and so such an output function provides very low sensitivity for low rotation rates.

As indicated above, photodetector 14 provides an output photocurrent i, which is proportional to the intensity of the electromagnetic waves impinging thereon, and is therefore expected to follow the cosine of the phase difference between these two waves impinging on that diode.

For sinusoidal bias modulation, the photodiode signal is given by the following equation:

$$i = (I_o/2)\eta(1+\cos(\phi_R + \phi_b \cos\omega_b t))$$

where: $I_o$ is the light intensity magnitude at photodetector 14 in the absence of any phase difference between counter-clockwise waves and $\eta$ is the detector responsivity coefficient.

Thus, the current depends on the resulting optical intensity of the two substantially coherent waves incident on the photodiode provided within photodetector 14, an intensity which will vary from a peak value of $I_o$ to a smaller value depending on how much constructive or destructive interference occurs between the two waves. This interference of waves will change with rotation of the coiled optical fiber forming loop 10 about its axis as such rotation introduces a phase difference shift of $\phi_R$ between the waves. Further, there is an additional variable phase shift introduced in this photodiode output current by modulator 19 with an amplitude value of $\phi_b$ and which is intended to vary as $\cos(\omega_b t)$, and $\omega_b$ is the radian frequency equivalent of the modualtion frequency $f_b$ supplied by the bias modulation system 20.

Thus, the output signal from photodetection system 14 is converted to a voltage and provided through an amplifier 21 where it is amplified and passed to PSD 23. Photodetection system 14, amplifier 21, PSD 23, and any filters included therein constitute signal component selector 35. PSD 23, serving as part of a phase demodulation system, is a well known device. PSD 23 extracts the amplitude of the fundamental frequency $f_b$ of the photodiode provided within photodetector 14 output signal, or the fundamental frequency of modulation signal generator 20 plus higher odd harmonics, to provide an indication of the relative phase of the electromagnetic waves impinging on the photodiode. For additional details regarding phase signal detectors and modulation techniques, see U.S. Pat. No. 5,602,642 to Bergh, et al, which is hereby incorporated by reference.

One challenge that arises in the design of fiber optic gyroscopes is the presence of polarization errors. There are two major classes of polarization errors, amplitude-type polarization errors and intensity-type polarization errors. Amplitude-type polarization errors are those errors that occur where electromagnetic waves that have passed through the blocking axis of polarizer 15, because of polarizer imperfections, coherently mix in any of the loop optical components, such as through splitter 17 and loop 10, with waves that have passed along the transmission axis of polarizer 15.

Intensity-type phase errors occur when electromagnetic wave polarization components that have passed along the transmission axis of polarizer 15 are coupled in any of these same optical components to the polarization components which have passed along the blocking axis and thereafter reach the blocking axis of polarizer 15 to interfere with opposite-traveling waves having the same history. In addition, a phase shift error in the opposite direction occurs for waves passing along the blocking axis of polarizer 15 and being coupled to reach the transmission axis.

Known systems often reduce these unwanted phase shift error via the use of one or more depolarizers. More particularly, referring now to FIG. 2, two segments of PM fiber 40(a) and 40(b) are spliced into the SM fiber comprising loop 10 via splices 52 and 53. These polarizers lead to the relatively uniform mixing of the electromagnetic wave components from the transmission and blocking axes of polarizer 15. To avoid signal fading, the depolarizers used on the ends of the SM fiber loop are typically of different lengths.

Depolarizers 40(a) and 40(b) distribute portions of the incoming wave components into orthogonal polarization states such that they become mixed at the other end of the depolarizer.

Referring now to FIG. 3, a birefringent fiber 40A is suitably designed to exhibit a difference in refractive index between orthogonal axes x and y, namely $N_X$ and $N_Y$, respectively. Birefringence may be induced through the use of an elliptical core or by imbedding stress rods within birefringent fiber 40A, as shown in FIG. 3. A pulse of light 304 entering the fiber at a 45-degree angle, such as via a 45-degree splice, is split into two components: $A_x$ 308 along the fast axis and $A_y$ 306 along the slow axis, separated by a delay of $\Delta L_{opt}$. The use of depolarizers 40A results in a significant cost savings as it obviates the need for using expensive PM fibers 40(a) and 40(b) for loop 10.

While it is possible to reduce polarization errors through the use of one or more polarizers as shown in FIG. 2, this configuration has a number of drawbacks. For example, the resultant system is susceptible to errors arising due to thermal excursions, such as rapid increases or decreases in temperature. This type of error is sometimes referred to as "T-dot" error, wherein the dot denotes the time rate of change of T. The errors Δφ resulting from fiber characteristics and the presence of different types of depolarizers 40 inserted into an otherwise optical loop is given by:

$$\Delta\phi = \frac{dOPL}{dT}\frac{dT}{dt}\Delta t$$

where: Δt is the time difference between when the two counter propagating waves pass through the point of interest, t is time, T is temperature, and OPL is optical path length. The further a point is from the center of the optical loop, the larger the time differential Δt, and therefor the larger the sensitivity. This implies that the depolarizers, located between the IOC and the loop, are the most sensitive sections of the optical loop.

Great care is often taken to wind loop 10 such that antipodal points on the loop are located proximate each other. In this way, any temperature variations experienced by a portion of the loop result in thermal expansions and/or contractions which tend to cancel each other out. With depolarizers 40 in the loop, however, there will be points along SM loop 10 which are adjacent to PM fibers 40(*a*) and 40(*b*). As SM fiber and PM fiber have very different structures in terms of core dimensions, cladding, buffers, etc., the two adjacent sections of fibers will generally react differently to thermal stress. That is, one type of fiber will generally expand or contract relative to the other fiber, resulting in a small but significant difference in path lengths between counter-rotating light beams.

Additional background information regarding polarization errors can be found in the proceedings reprint by Szafraniec et al., entitled "Performance Improvements in Depolarized Fiber Gyros" which was presented at the EUROPT Conference on Fiber Optic and Laser Sensors XIII, in Munich, Germany, Jun. 20–21, 1995, and U.S. Pat. No. 5,377,283 to Blake, et al., which are both hereby incorporated by reference.

In light of the above, systems and methods are needed in order to overcome these and other limitations of the prior art. Specifically, there is a long-felt need for precise fiber optic gyroscopes which minimize polarization errors while maintaining mechanical and thermal symmetry of the fiber loop.

SUMMARY OF THE INVENTION

In accordance with an aspect of the present invention, a fiber optic gyroscope comprises a loop, a depolarizing region, first, second, third, and fourth optical sections, and first, second, third and fourth splices. The loop includes a single mode optical fiber having a first end and a second end. The depolarizer region is coupled to the loop, and the depolarizer region includes the first optical fiber section coupled to the second optical fiber section via the first splice, and the third optical fiber section is coupled to the fourth optical fiber section via the third splice. The first optical fiber section is coupled to the first end of the loop via a second splice, and the third fiber section is coupled to the second end of the loop via a fourth splice. The first, second, third, and fourth fiber sections comprise polarization maintaining fibers. The first splice has an alignment between 35° and 55° between a major axis of polarization of the first optical fiber section and a major axis of polarization of the second optical fiber section, and the third splice has an alignment between 35° and 55° between a major axis of polarization of the third fiber section and a major axis of polarization of the fourth fiber section. As a result, thermal and mechanical influences on the optical path lengths of each one of the optical fiber sections are substantially the same.

In another aspect of the present invention, a method for minimizing time-derivative errors in a fiber optic gyroscope comprises the following: providing a depolarizer having two segments of polarization maintaining optical fiber coupled to an optical fiber loop wherein the two segments are of substantially equal length; providing each polarization maintaining optical fiber segment with two optical fiber sections connected together via a splice, each splice having an angle from about 35° to 55° between major axes of polarization of the corrsponding pair of optical fiber sections; and choosing the length of each optical fiber section to maintain thermal and/or mechanical symmetry of the optical fiber loop.

In accordance with a further aspect of the invention, an inertial guidance system includes a fiber optic gyroscope. The fiber optic gyroscope comprises a light source having a short coherence length, an integrated optic chip coupled to the light source, a fiber loop having a fixed length, and a depolarizer. The depolarizer includes two polarization maintaining fiber segments. Each of the fiber segments includes one or more splices and couples a respective end of the fiber loop to the integrated optic chip, so that mechanical and/or thermal symmetry is maintained and polarization errors are suppressed.

BRIEF DESCRIPTION OF THE DRAWING

These and other features and advantages will become more apparent from a detailed consideration of the invention when taken in conjunction with the drawings in which.

DETAILED DESCRIPTION

A fiber optic gyroscope in accordance with the present invention includes a depolarizer configured to provide suppression of polarization errors, while at the same time maintaining mechanical and/or thermal symmetry of the fiber loop.

Figure 1:
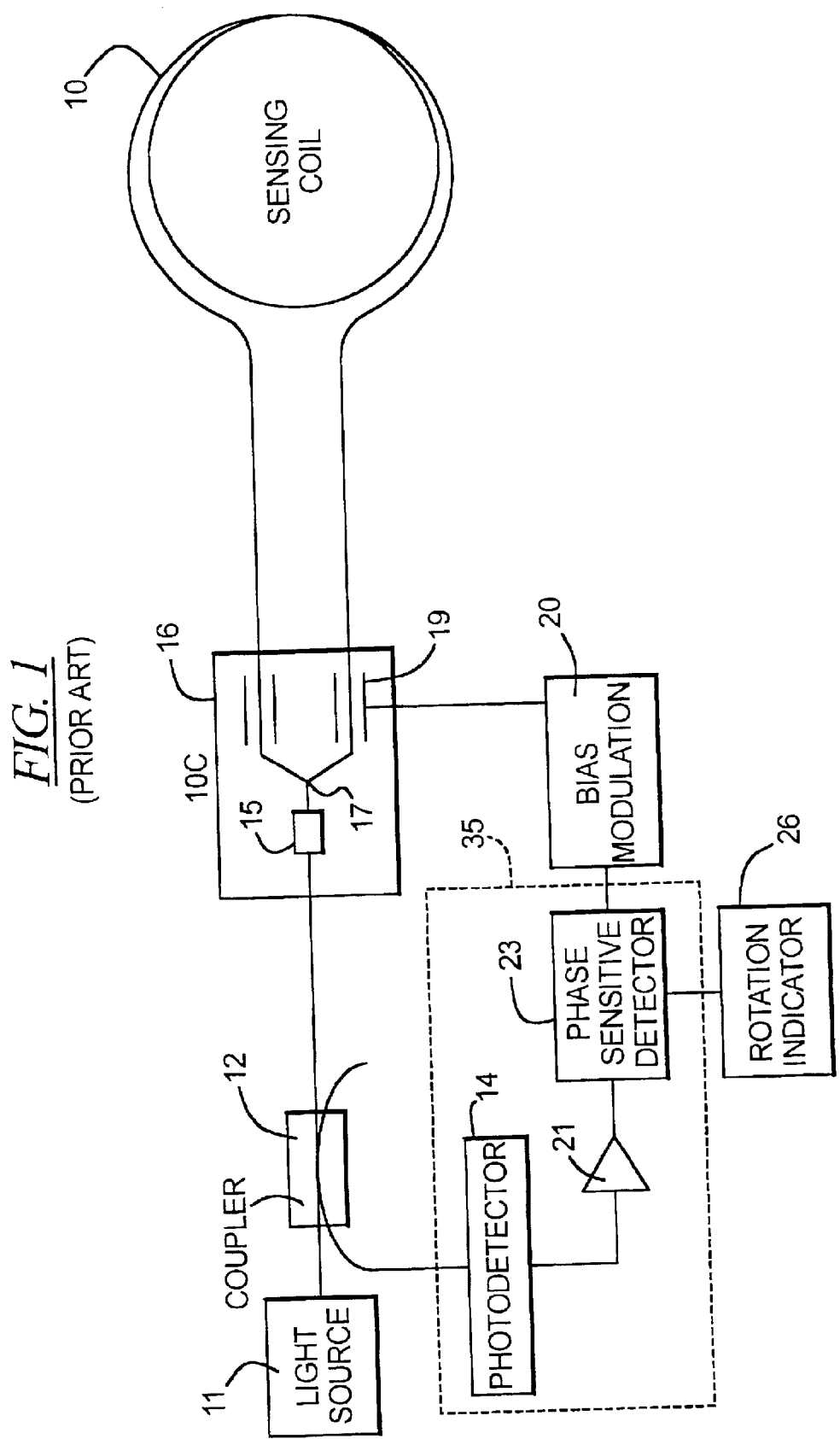
FIG. 1 shows a prior art minimum reciprocal configuration fiber optic gyroscope.
Figure 2:
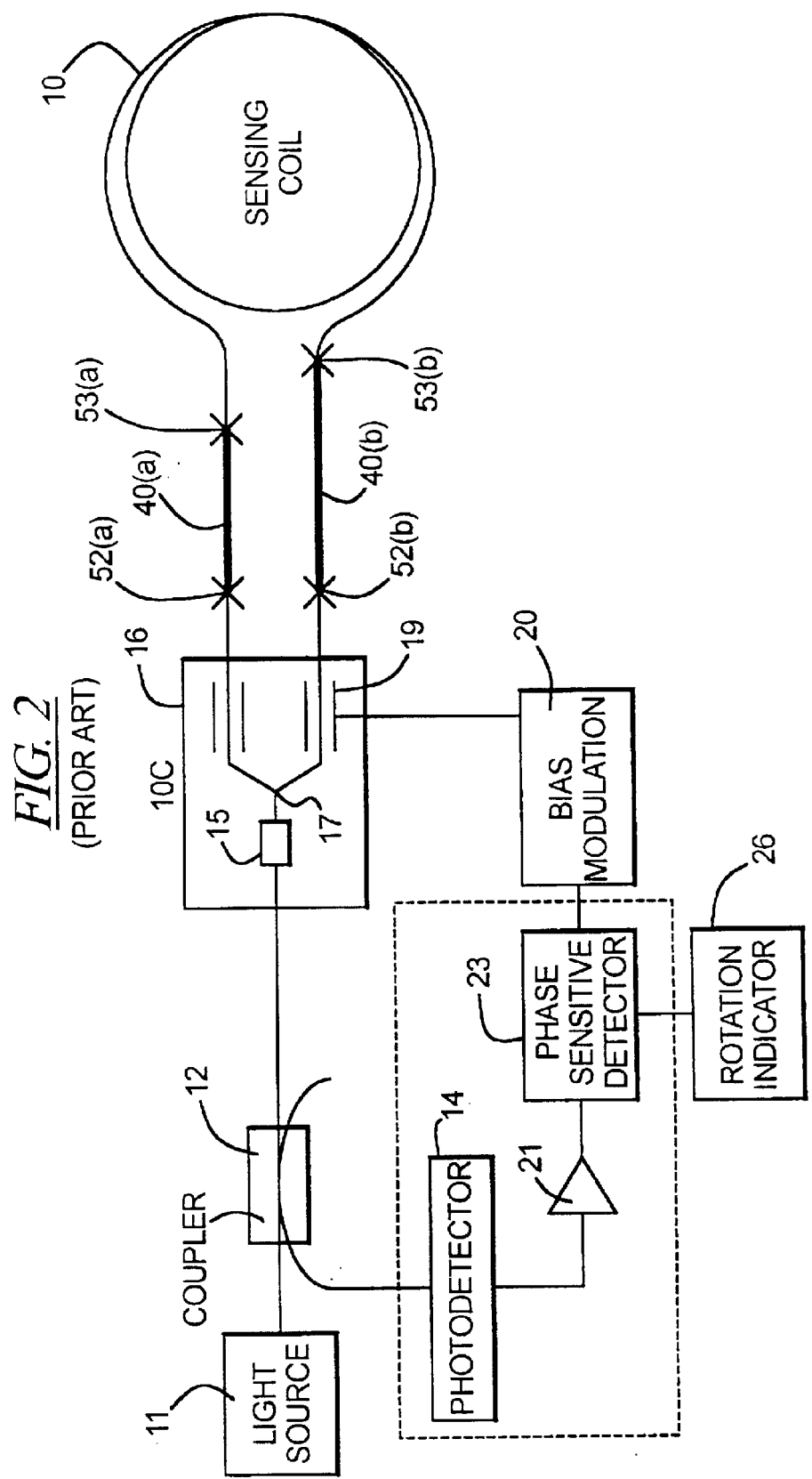
FIG. 2 shows a prior art fiber optic gyroscope incorporating depolarizers.
Figure 3:
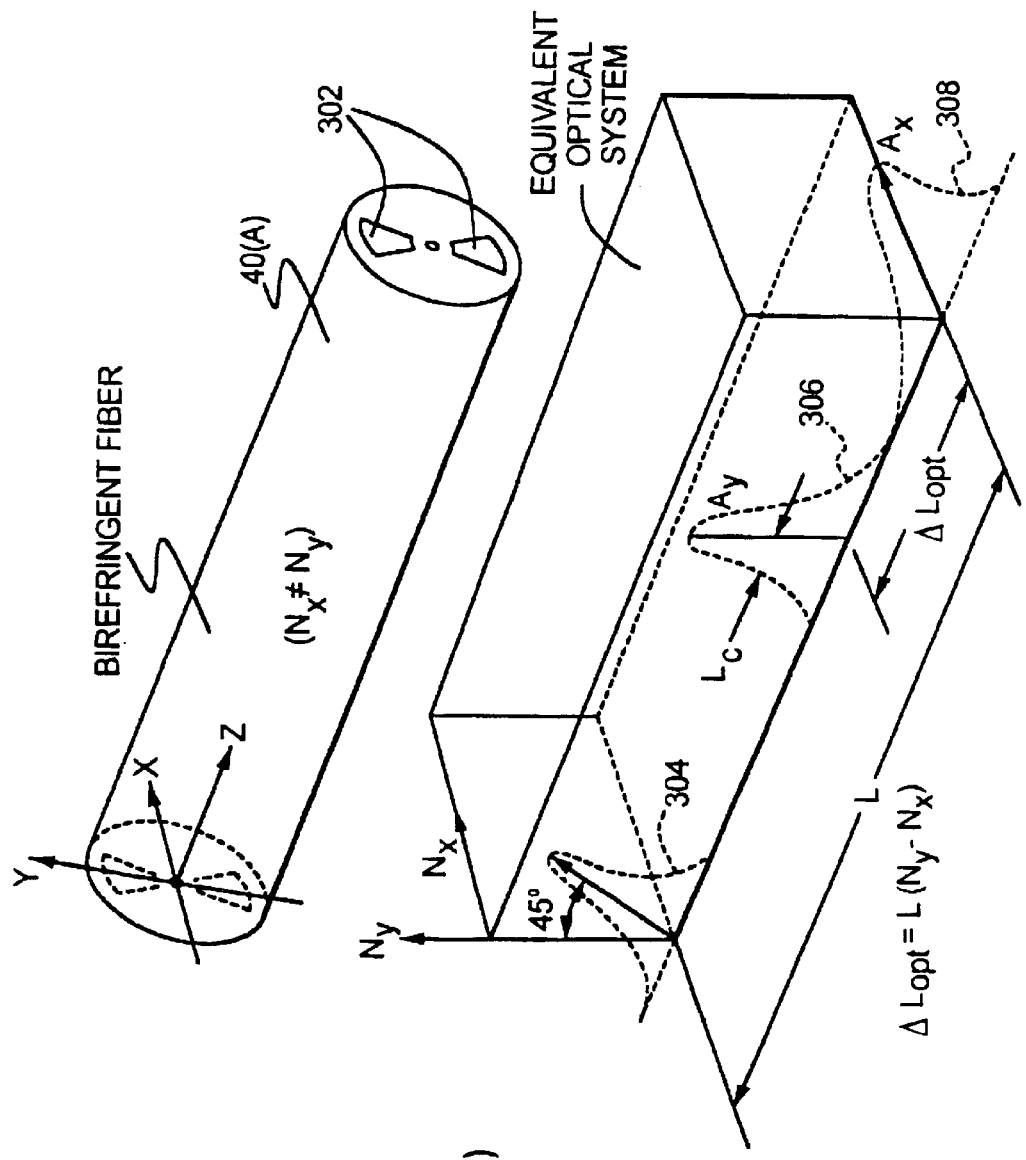
FIG. 3 shows a polarization function of a birefringent fiber.
Figure 4:
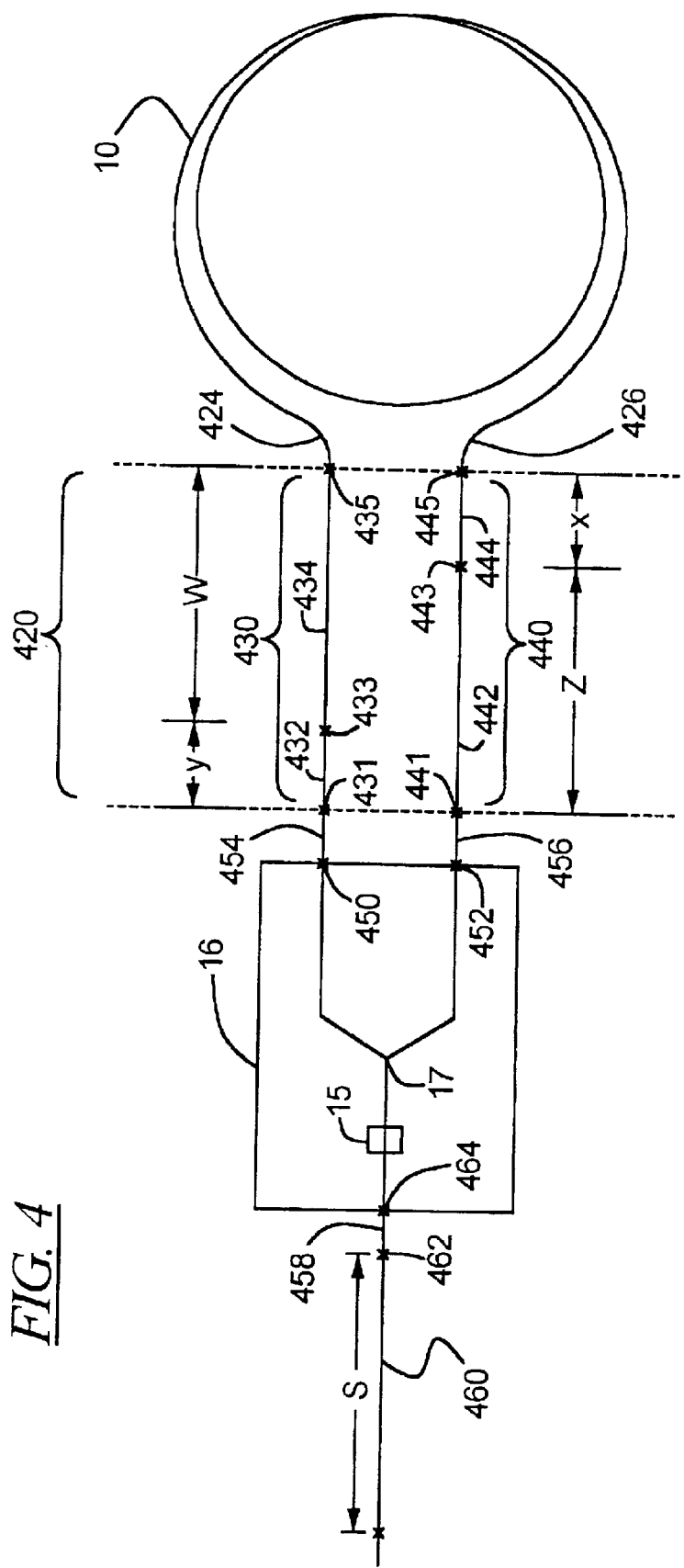
FIG. 4 shows a fiber optic gyroscope incorporating a depolarizer region in accordance with the present invention.

Referring now to FIG. 4, a fiber optic gyroscope in accordance with an exemplary embodiment of the present invention comprises a depolarizer region 420 coupled to an integrated optical chip (IOC) 16 and a fiber loop 10. In general, depolarizer region 420 includes a pair of PM fiber segments 430, 440 of substantially equal length having splices 433, 443 position therein. A front end section of fiber 460 is spliced via splice 462 to fiber segment 458 which is coupled to IOC 16.

A light source (not shown) may include a semiconductor light source, such as a laser diode system. Such systems typically operate in the near-infrared region, which is about 830 nm to 1550 nm. It is desirable for the light source used in conjunction with fiber optic gyroscope of the present invention to have a short coherence length, thereby reducing phase shift errors introduced by Rayleigh and Fresnel scattering. However, any convenient fiber light source (FLS) can be used.

Fiber loop 10 comprises a loop of optical fiber, preferably single-mode (SM) fiber, the length of which may be selected in accordance with various designs. But, in a preferred embodiment, fiber loop 10 comprises a coil of symmetrically-wound SM fiber approximately 1000 m in length.

The IOC 16 comprises a polarizer 15, and a splitter 17 configured to split and modulate the incoming light into two ports 450, 452 and recombine the counter-rotating beams of light returning back to these ports from fiber loop 10 by way of depolarizer region 420. As described above, IOC 16 also includes a polarizer 15 having a blocking axis and transmission axis.

Although the present invention is described in the context of an integrated optic chip, other assemblies, such as conventional coil couplers, may also be used. Thus, the use of the term IOC is used throughout this application without loss of generality. Many commercially available integrated optic chips are suitable for use in the present invention, such as the 47 mm IOC manufactured by UTP of Denmark.

Generally, depolarizer 420 comprises two polarization maintaining (PM) fiber segments 430 and 440, affixed to respective ends 424 and 426 of fiber loop 10, and one or more splices 433, 443 which are configured in such a way as to suppress polarization errors. Fiber segments 430 and 440 are preferably chosen to maintain substantial symmetry with respect to various mechanical and/or thermal properties.

Fiber segment 430 comprises two sections of fiber, namely section 432 and section 434. Section 432 is preferably coupled at one end to IOC 16 via a short fiber segment 454 and a splice 431, and at the other end to section 434 via a splice 433. Section 434, in turn, is coupled to the end 424 of fiber loop 10 via a splice 435.

Similarly, on the opposite end 426 of fiber loop 10, fiber segment 440 comprises two sections of fiber, namely section 432 and section 434. Section 444 is coupled at one end to fiber loop 10 via splice 445, and at the other end to section 442 via splice 443. Section 442 is preferably coupled to IOC 16 via a splice 441 and a short fiber segment 456.

The present invention achieves optical symmetry with respect to the loop including depolarizer region 420 and fiber loop 10. Thus, a preferred embodiment of the present invention utilizes the same type of fiber for segments 430 and 440. Similarly, short fiber sections 454 and 456 are preferably manufactured using the same type of fiber. More particularly, fiber segments 430 and 440 comprise PM fiber, and fiber sections 454 and 456 preferably comprise PM fiber. As a result, when the loop 10 and depolarizer region 420 are formed into a tight coiled assembly, the resulting system will be thermally symmetrical, such that any point within loop 10 or depolarizer region 420, when carefully wound, will be adjacent to the opposite point within loop 10 or depolarizer 420 which, due to this configuration, will comprise the same type of fiber. In this way, the effects of mechanical strain arising from thermal excursions can be eliminated or reduced.

Splices 433 and 443 are suitably aligned at about 35° and 55°, preferably 45°. More particularly, fiber section 432 is joined via splice 433 to section 434, such that approximately a 45° angle is formed between the major axis of the state of polarization of section 432 and the major axis of the state of polarization of section 434.

Similarly, fiber section 442 is joined, via splice 443, to section 444, such that an approximately 45° angle is formed between the major axis of the state of polarization of section 442 and the major axis of the state of polarization of section 444.

To facilitate the discussion of various embodiments of the present invention, dimensions w, x, y, and z, correspond to sections 434, 444, 432, and 442, respectively, as illustrated in FIG. 4. However, the particular locations of splices 433 and 443, as illustrated in FIG. 4, are not intended to be limiting.

Depolarizer 420 must exhibit mechanical and/or thermal symmetry. The length of segment 430 (i.e., w+y) must be the same or substantially the same as the length of segment 440 (i.e., x+z). In one embodiment of the present invention, both segments 430 and 440 are about seven meters in length, and the length of fiber section 434 is greater than that of section 444.

In a particularly preferred embodiment, the length of section 434 is an integer multiple of the length of section 444, such that w=nx, where n is an integer, for example, n=2. A section of PM fiber 460 having a length s is preferably used as a "front-end" to IOC 16, wherein section 460 is suitably spliced to a segment 458 of SM fiber coupled to IOC 16.

In general, the present invention solves an optical problem using thermo-mechanical techniques, in that known fiber optic gyroscopes fail to address both mechanical symmetry and reduction of polarization errors. In this regard, while the present invention embraces many particular depolarizer configurations, a preferred embodiment will now be described in detail, including measurements and an example technique by which these measurements may be derived.

As the characteristics of a particular lot of PM fiber may vary, it is advantageous to express lengths of fiber in terms of "beat length" ($L_B$), such that, $L_B = \lambda/\Delta N$, where $\lambda$ is the mean wavelength of light in the fiber, and $\Delta N$ is the difference in group refractive index between the fast and slow axes of the PM fiber. Typically, $L_B$ for typical PM fiber ranges from about 1 mm to about 3 mm. However, $\Delta N$ may be determined for a particular lot of fiber using known empirical measurement techniques.

With continued reference to FIG. 4, a preferred embodiment of the present invention is characterized by the following dimensions:

x=1100$L_B$ y=800$L_B$ w=2x=2200$L_B$ z=1900$L_B$ s=4400$L_B$

The lengths of SM sections 458, 454, and 456 are each about 100$L_B$, and the length L of IOC 16 is about 47 mm.

The preceding embodiment is just one possible embodiment of the present invention. Other solutions may be derived using suitable optimization techniques. For example, the illustrated embodiment was generally derived by (1) quantifying all combinations of polarization errors that could occur in the system in terms of w, x, y, z, and s; (2) simplifying the expression algebraically so as to eliminate terms which are likely to be diminishingly small; and (3) determining an optimal solution within the resultant design space which minimizes polarization errors.

Figure 5:
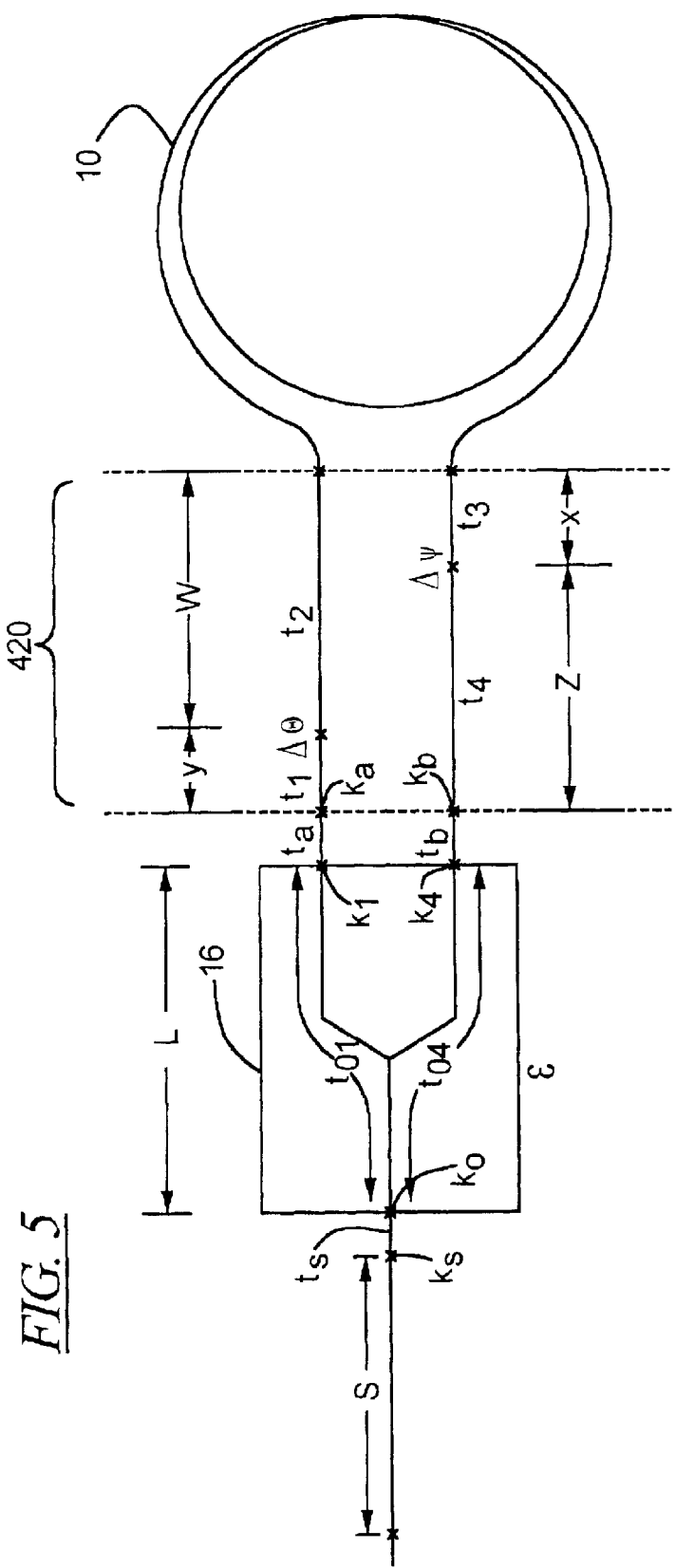
FIG. 5 shows the fiber optic gyroscope of FIG. 4 incorporating delay and polarization optimization variables in accordance with the present invention.

FIG. 5 shows the optical system of FIG. 4 with the various fiber segments and splices labeled with variables used in the course of optimization.

More particularly, t2, t01, t04, ta, tb, t1, t2, t3, and t4 respectively describe the birefringence-induced delays in section 460, IOC 16 from splice 464 to splice 450, IOC 16 from splice 464 to splice 452, section 454, section 456, section 432, section 434, section 444, and section 442. Variables ks, k0, k1, k4, ka, and kb respectively describe small polarization cross-coupling occurring at splices 462, 464, 450, 452, 431, and 441. Angles ΔΘ ("delta theta" or "dth") and Δψ ("delta psi" or "dpsi") are used to characterize the small misalignment present at splices 433 and 443, respectively.

Expressions for the various amplitude and intensity errors are derived in terms of appropriate design variables, such as K0, k1, t2, t01, etc. for instance, EpsErr refers to amplitude-type errors, and EpsErr[t04−t2] describes the amplitude-type errors associated with the t04−t2 component. This error is a function of dPow "degree of polarization of incoming signal", dth, eps "extinction ration", k0, and k4. In addition, each of these terms will be multiplied by an associated value of the coherence function as described below.

It will be appreciated that due to the large number of splices present in the optical path shown in FIG. 4, there will be a large number of amplitude and intensity error terms produced by the various delay permutations. For the purpose of reducing computational complexity, it is therefore desirable to limit the number of error terms used for optimization.

This can be done by considering only terms that are likely to result in significant values, and dispensing with terms likely to be negligible. More particularly, it is possible to inspect each term for the presence of certain types of values, assign a weighting to each type of value, then dropping terms whose combined weight exceeds some suitable threshold value. For example, a weighting of one is give to all k values k0, k4, etc., and a weighting of 2 is given to the extinction ratio value (eps). The resulting EpsErr expression is then inspected for the occurrence of these value types, and if the total weight of the expression exceeds 4, that particular EpsErr is dropped and not included in subsequent calculations. For example, EpsErr[t04−t2] includes an "eps" term weight of two, and two "k" terms, each having a weight of one. The combined weight of the expression is four, and thus the expression is retained. In some instances, it may be advantageous to keep terms even in cases where the weight of expression exceeds the threshold value where either terms dpsi or dth appear in the expression.

As mentioned above, each of the EpsErr terms have an associated coherence function value by which it will be multiplied. The coherence function, or the autocorrelation function, relates to the electromagnetic waves emitted by the light source. The exact shape of the coherence function will vary depending upon the particular source.

In addition, it may be advantageous for optimization purposes to incorporate delay associated with loop 10 into the coherence function. For a detailed discussion of these and other aspects of coherence functions, see, for example, U.S. Pat. No. 5,377,283 to Blake, et al., which is hereby incorporated by reference. Regardless of the type of light source being used, each delay is associated with a unique value of the coherence function.

In accordance with a Gaussian coherence function, the coherence value is a maximum of 1.0 at zero delay and reduces to 0.0 at a particular known value. Thus, the coherence value for the t04−t2 term in a Gaussian source would be a maximum at t04=t2, and would drop off as the difference between the two values increases. Optimization of the gyroscope consists of expressing t1, t2, t3, etc. in terms of the design variables, then finding a set of values for which the sum of all EpsErr values, after multiplying by the corresponding coherence function, results in an acceptably low total error. In the illustrated embodiment, for example, the following values and constraints are used:

Lb=0.019;(* beat length in LiNbO3 is expressed in mm, and birefringence induced delays are expressed as L/Lb *)
ts=s
ta=100
tb=100
t01=47.0/Lb;(*47 mm—length of IOC chip *)
t04=47.0/Lb+0.125/Lb
t1=y
t2=2x(*longer depolarizer segment*)
t3=2x(*shorter depolarizer segment*)
t4=Abs[y]+Abs[x]; (*EQUAL LENGTH CONSTRAINT*)
dpsi=1.5/180 N[Pi] (*deviations from 45°*)
dth=1.5/180 N[Pi]
k=10.0^(−1.5) (*cross-coupling points*)
ka=10.0^(−1.5)
kb=10.0^(−1.5)
ks=1.0
k0=10.0^(−1.5)
k1=10.0^(−1.5)
k4=10.0^(−1.5)
eps=10.0^(−3.0) (*60 db polarizer*)
dPow=10^(−1.5) (*degree of polarization*)

Thus, the variables t1, t2, t3, and t4 are expressed in terms of x and y, where w=2x and z=x+y. In accordance with the relationships derived for EpsErr, a response surface graph of polarization errors is suitably produced for different values of x, y, and s. A set of parameter values may then be chosen such that the polarization error is at a reasonable minimum. In a preferred embodiment, as mentioned above, the values $x=1100L_B$; $y=800L_B$; $w=2x=2200L_B$; $z=1900L_B$; and $s=4400L_B$ produce a suitably optimal result where the lengths of SM sections 458, 454, and 456 are each about $100L_B$, and the length L of IOC 16 is about 47 mm.

In summary, a depolarized, navigation-grade fiber optic gyroscope has been described which provides suppression of polarization errors while at the same time maintaining mechanical symmetry of the fiber loop.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A fiber optic gyroscope comprising:
   a loop including a single mode optical fiber having a first end and a second end; and
   a depolarizer region coupled to said loop, said depolarizer region comprising:
      a first optical fiber section;
      a second optical fiber section coupled to said first optical fiber section via a first splice;
      a third optical fiber section;
      a fourth optical fiber section coupled to said first optical fiber section via a third splice;
   wherein
      said first optical fiber section is coupled to said first end of said loop via a second splice;
      said third optical fiber section is coupled to said second end of said loop via a fourth splice;
      said first optical fiber section has a length y, said second optical fiber section has a length w, said third optical fiber section has a length z, and said fourth optical fiber section has a length x and wherein x+z is substantially equal to w+y;

wherein w>x and z>y;

said first, second, third and fourth fiber sections comprise polarization maintaining fibers;

said first splice having an alignment between 35° and 55° between a major axis of polarization of said first optical fiber section and a major axis of polarization of said second optical fiber section; and said third splice having an alignment between 35° and 55° between a major axis of polarization of said third fiber section and a major axis of polarization of said fourth fiber section, whereby thermal and mechanical influences on the optical path lengths of each one of said optical fiber sections are substantially the same.

2. The fiber optic gyroscope of claim 1, wherein w is substantially equal to n*x, and n is an integer.

3. The fiber optic gyroscope of claim 2, wherein n=2.

4. The fiber optic gyroscope of claim 1, wherein x+z is a length measuring between 6.5 meters and 7.5 meters.

5. The fiber optic gyroscope of claim 1, wherein each one of said first, second, third, and fourth optical fiber sections exhibit a beat length $L_B$, and wherein w is substantially equal to $2200L_B$, x is substantially equal to $1100L_B$, y is substantially equal to $800L_B$, and z is substantially equal to $1900L_B$.

6. A method for minimizing time-derivative errors in a fiber optic gyroscope, the method comprising:

providing a depolarizer having two segments of polarization maintaining optical fiber, a first segment, and a second segment, coupled to an optical fiber loop, wherein the two segments are of substantially equal length;

providing each polarization maintaining optical fiber segment with two optical fiber sections connected together via a splice, each splice having an angle from about $35^B$ to $55^B$ between major axes of polarization of the corresponding pair of optical fiber sections, said first optical fiber section has a length y, said second optical fiber section has a length w, said third optical fiber section has a length z, and said fourth optical fiber section has a length x; and wherein x +z is substantially equal to w+y, wherein w>x and z>y; and choosing the length of each optical fiber section to maintain at least one of thermal and mechanical symmetry of the optical fiber loop.

7. The method of claim 6, wherein the depolarizer is coupled to an integrated optical chip and the optical fiber loop.

8. The method of claim 6, wherein the optical fiber loop is a single mode optical fiber loop.

9. An inertial guidance system including a fiber optic gyroscope, the gyroscope comprising:

a light source having a short coherence length;

an integrated optic chip coupled to the light source;

a fiber loop having a fixed length, and having a first end and a second end; and a depolarizer including two polarization maintaining fiber segments, a first segment and a second segment, each of said fiber segments including one or more splices and coupling a respective end of said fiber loop to the integrated optic chip, wherein at least one of mechanical and thermal symmetry is maintained and polarization errors are suppressed, a splice in said first segment joining two sections of said first segment being located further away from said first end of said fiber loop than a splice in said second segment joining two sections of said second segment is located away from said second end of said fiber loop.

10. The inertial guidance system of claim 9, wherein said fiber loop comprises a coil of symmetrically wound single mode fiber measuring approximately 1000 meters in length.

11. The inertial guidance system of claim 9, wherein said integrated optic chip comprises a polarizer having blocking axis and a transmission axis, and a splitter which splits and modulates incoming light.

12. The inertial guidance system of claim 9, wherein the splice coupling said first section and said second section has an angle from about $35^B$ to $55^B$ between major axes of polarization of said first and second sections.

13. The inertial guidance system of claim 9, wherein said splice coupling said third section to said fourth section has an angle from about $35^B$ to $55^B$ between major axes of polarization of said third and fourth sections.

14. The inertial guidance system of claim 9, wherein said first section has a length y, said second optical fiber section has a length w, said third optical fiber section has a length z, and said fourth optical fiber section has a length x, wherein x+z is substantially equal to w+y.

15. The inertial guidance system of claim 14, wherein w is substantially equal to n*x. and n is an integer.

16. The inertial guidance system of claim 15, wherein n=2.

17. The inertial guidance system of claim 16, wherein x+z is a length measuring between 6.5 meters and 7.5 meters.

18. The inertial guidance system of claim 14, wherein each one of said first, second, third, and fourth optical fiber sections exhibit a beat length $L_B$, and wherein w is substantially equal to $2200L_B$, x is substantially equal to $1100_B$, y is substantially equal to $800L_B$, and z is substantially equal to $1900L_B$.

19. The inertial guidance system of claim 9, wherein said integrated optic chip comprises a polarizer and a splitter configured to split and modulate incoming light into ports, and recombine counter-rotating beams of light from said loop via said depolarizer.

* * * * *

UNITED STATES PATENT AND TRADEMARK OFFICE
CERTIFICATE OF CORRECTION

PATENT NO. : 6,801,319 B2
DATED : October 5, 2004
INVENTOR(S) : Bogdan Szafraniec et al.

It is certified that error appears in the above-identified patent and that said Letters Patent is hereby corrected as shown below:

Column 10,
Line 14, change "t3=2x(*shorter depolarizer segment*)" to
-- t3=x(*shorter depolarizer segment*) --.

Column 11,
Lines 37 and 38, change "$35^B$ to $55^B$" to -- 35° to 55° --.

Column 12,
Lines 26 and 30, "$35^B$ to $55^B$" to -- 35° to 55° --.
Line 38, change "n*x." to -- n*x, --.
Line 46, change "to $1100_B$, y" to -- to $1100L_B$, y --.

Signed and Sealed this

Thirtieth Day of August, 2005

JON W. DUDAS
*Director of the United States Patent and Trademark Office*